Feb. 11, 1958 E. G. PODOLAN 2,823,072
AIR DEFLECTOR FOR VEHICLE WINDSHIELD
Filed Jan. 16, 1956 3 Sheets-Sheet 1

INVENTOR.
Edward G. Podolan
BY Paul Fitzpatrick
ATTORNEY

Feb. 11, 1958 E. G. PODOLAN 2,823,072
AIR DEFLECTOR FOR VEHICLE WINDSHIELD
Filed Jan. 16, 1956 3 Sheets-Sheet 2

INVENTOR.
Edward G. Podolan
BY
Paul Fitzpatrick
ATTORNEY

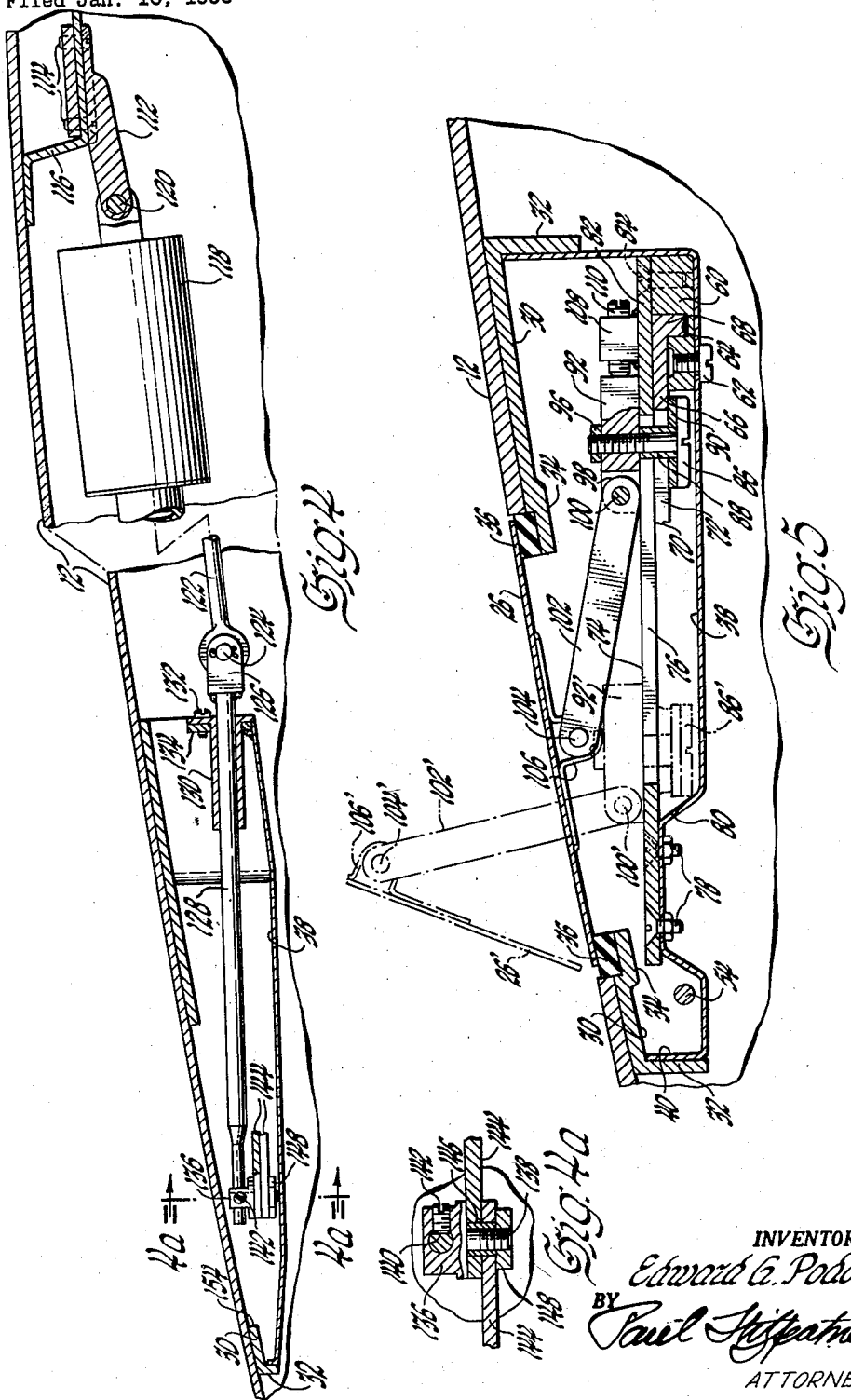

2,823,072

Patented Feb. 11, 1958

United States Patent Office

2,823,072

AIR DEFLECTOR FOR VEHICLE WINDSHIELD

Edward G. Podolan, St. Clair Shores, Mich., assignor to General Motors Corporation, Detroit, Mich., a corporation of Delaware Application January 16, 1956, Serial No. 559,407

8 Claims. (Cl. 296—91)

This invention relates to air deflectors for vehicle bodies and more particularly to an air deflector movable from a closed position plane with a body airfoil surface to an open position angular with respect to the body surface and the direction of air flow, and to the operating mechanism for such an air deflector.

The primary object of this invention is to provide a new and improved air deflector for vehicle body airfoil surfaces. Another object of this invention is to provide a new and improved air deflector for vehicle body airfoil surfaces which is movable between a closed position plane with the body surface to an open position angularly related to the body surface and to the direction of air flow. A further object of this invention is to provide an improved operating mechanism for an air deflector adapted to be mounted on a vehicle body panel and movable between a closed position plane with the airfoil surface of the panel and an open position angularly related to the airfoil surface and to the direction of air flow.

These and other objects of this invention will be readily apparent from the following specification and drawings, wherein:

Figure 4 is a sectional view on the plane indicated by line 4—4 of Figure 3;

Figure 4a is an enlarged sectional view taken on the plane indicated by line 4a—4a of Figure 4; and Figure 5 is a sectional view taken on the plane indicated by line 5—5 of Figure 3.

Figure 1:
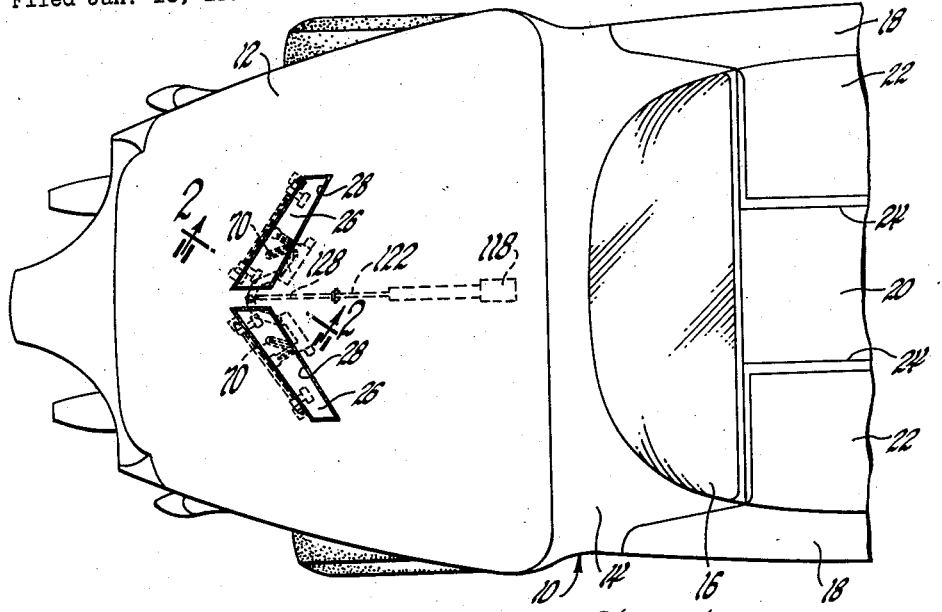
Figure 1 is a plan view of a portion of a vehicle body embodying an air deflector according to this invention.

Referring now to Figure 1 of the drawings, a vehicle body 10 includes a hood or forward airfoil panel 12, a body cowl portion 14, a curved windshield 16 extending upwardly and rearwardly from the body cowl portion, a front door 18 on either side of the body, a longitudinal support member 20 extending from the upper edge portion of windshield 16 to the upper edge portion of the vehicle backlite (not shown), and a transparent upper door portion 22 on either side of the body extending between the windshield 16 and the vehicle backlite and hinged at its upper edge 24 to panel 20 and sealed at its lower edge against the upper edge portion of door 18. An air deflector 26 is mounted on the hood or airfoil panel 12 to either side of the center line of the body. As can be seen in Figure 1, the air deflectors are angularly related to the center line of the body and are movable between a closed position plane with the airfoil surface of panel 12 as shown in Figure 1 and an open position wherein the air deflectors are located angularly with respect to the airfoil surface of panel 12 and to the direction of air flow as will be described.

Figure 2:
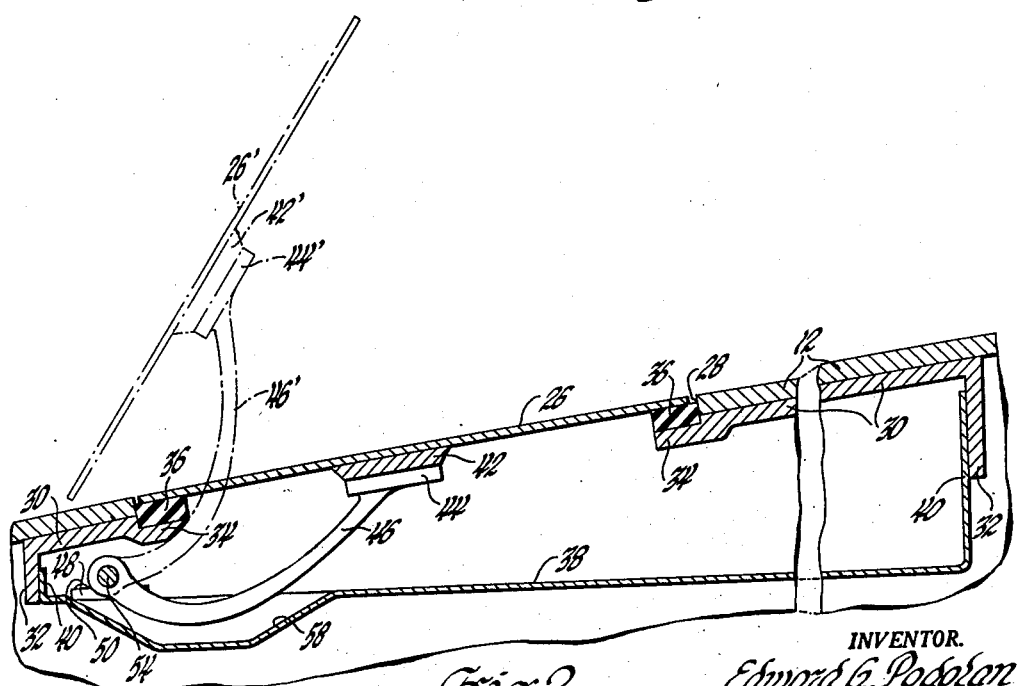
Figure 2 is a sectional view on the plane indicated by line 2—2 of Figure 1.
Figure 3:
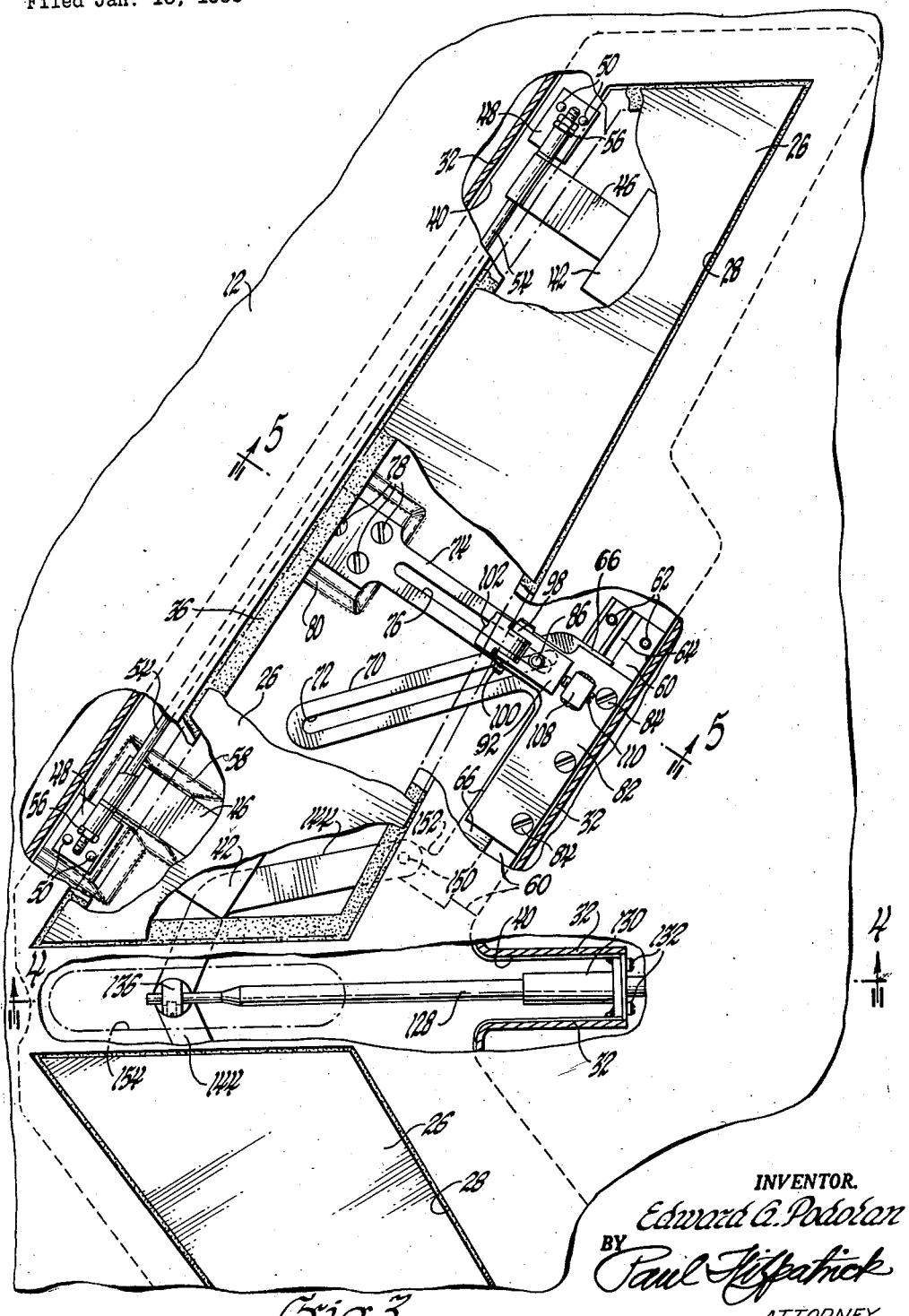
Figure 3 is an enlarged view of a portion of Figure 1 with parts broken away for clarity of illustration.

Referring now to Figures 1, 2, and 3 of the drawings, a pair of openings 28 of substantially the size and shape of the air deflectors 26 are cut into the panel 12 of the body. A support ring 30 is secured to the inner surface of panel 12 around both openings 28 and includes a continuous depending flange 32. Support ring 30 includes a spaced pair of continuous offset flange ring portions 34 extending partially within each opening 28 and supporting a weather strip 36 which is cemented or otherwise secured to the flange portions to provide a seal for each of the air deflectors 26 in the closed position thereof as shown in Figures 2 and 3. A housing 38 includes an upwardly extending continuous flange 40 which is secured to the depending flange 32 of support ring 30 to mount the housing on the body.

The air deflectors are of the same construction and are synchronously operated by a single power actuator. Only the right hand air deflector and the operating mechanism for both deflectors will be particularly described. A metal plate 42 is secured to the lower surface of the air deflector 26 adjacent the inboard and outboard edges thereof. The terminal flange portion 44 of a gooseneck hinge arm 46 is welded or otherwise secured to each plate 42 to rigidly secure the hinge arms to the air deflector. A hinge mounting bracket 48 is bolted at 50 to the lower wall of housing 38 adjacent the inboard and outboard edges of the air deflector. Each hinge mounting bracket includes an upwardly extending apertured lug and a hinge rod 54 received within the apertured lugs is secured in place by nuts 56 threaded on the threaded ends of the rod and bearing against one face of the mounting bracket lugs in the assembled position of the rod. The other terminal end of each hinge arm 46 is suitably apertured to receive rod 54 so that the hinge arms are swingably mounted on the rod.

Thus, it can be seen that the air deflector is mounted on the body for swinging movement about a hinged axis adjacent the forward edge of the air deflector and angularly related with respect to the center line of the body. Each of the hinge arms 46 is rotatably mounted on rod 54 and rigidly secured to the air deflector to swing the air deflector about the hinge axis defined by the rod when the air deflector is moved between its open and closed positions. As can be seen particularly in Figure 2 of the drawings, the lower wall of housing 38 is offset at 58 in order to allow for swinging movement of the inboard hinge arm. The lower wall of housing 38 is spaced a sufficient distance from the outboard hinge arm to allow for swinging movement of this hinge arm.

Referring now particularly to Figures 3 and 5 of the drawings, a track 60 is rigidly secured to the lower wall of housing 38 at 62. The track includes a groove 64 which is located substantially parallel with the hinge axis defined by rod 54. A slide 66 includes a rearward depending flange 68 which is slidably mounted in groove 64 to mount the slide on the body for movement substantially parallel to the hinge axis defined by rod 54. Slide 66 includes an angularly extending portion 70 having a closed slot 72. A guide 74 which includes a closed slot 76 has its forward portion bolted at 78 to an upwardly extending embossed portion 80 of the lower wall of housing 38. Guide 74 also includes a laterally extending portion 82 bolted at 84 to track 60 and located above slide 66 so as to prevent removal of flange 68 of the slide from slot 64 of the track.

A stud 86 extends upwardly through slot 72 of portion 70 of the slide and through slot 76 of guide 74. A bushing 88 is positioned on the stud within slots 72 and 76 and a resilient washer 90 fits between the head of the stud and the lower surface of the laterally extending portion 70 of the slide. A hinge block or slidable member 92 includes an aperture which slidably receives the shank of stud 86. The hinge block is secured to the stud in engagement with the upper surface of guide 74 and the upper edge of bushing 88 by a nut 96 threaded on the shank of the stud. Bushing 88 has a diameter substantially equal to the width of slots 72 and 76 to prevent lateral movement of the stud within the slots. The upper edge of the bushing acts as a spacer for the hinge block 92 to prevent binding between the lower surface of the hinge block and the upper surface of guide 74.

The hinge block 92 includes a pair of spaced ears 98 which mount a pin 100. A link 102 has one end thereof swingably mounted on pin 100 and the other end swingably mounted on a pin 104 which is fixedly mounted within a hinge pin supporting bracket 106 secured to the lower surface of the air deflector 26. An upwardly extending threaded lug 108 on the laterally extending portion 82 of guide 74 mounts a threaded adjusting pin 110 which is adapted to bear against the rear face of the hinge block 92 to locate the hinge block in its rearward terminal position and locate the air deflector 26 in closed position as shown in Figure 5.

Referring now particularly to Figures 4 and 4a of the drawings, an actuator mounting bracket 112 is bolted at 114 to a cross member 116 which spans body panel 12 and is rigidly secured thereto. A power actuator 118 is pivotally secured to bracket 112 at 120. The power actuator slidably supports a rod 122 for extension and retraction movement relative to the actuator. Rod 122 is pivotally secured at 124 between the walls of a U-shaped bracket 126 which is welded to the rear end of a rod 128. Rod 128 is slidably mounted within a bushing 130 which is bolted at 132 to a plate 134 secured to support ring 30. The forward portion of rod 128 of reduced diameter is received within an upwardly extending apertured ear 136 of a stud 138. The rod is cut out at 140 and a threaded set screw 142 mounted within ear 136 of the stud is received within the cut out portion 140 of the rod to rigidly secure the rod to the stud. A pair of offset angular links 144 are pivotally mounted on the shank of stud 138 within a bushing 146 being provided between the shank of the stud and the links. A nut 148 threaded on the shank of the stud secures the links in place. As can be seen particularly in Figure 3 of the drawings, the other end of one of the links 144 is pivotally secured at 150 to a laterally extending ear 152 of slide 66. A portion of the support ring 30 is cut out at 154 between the right and left hand air deflectors to provide clearance for movement of stud 138.

Referring now particularly to Figures 3 and 5 of the drawings, the operation of the air deflector will be described. In the closed position of the air deflector, rods 122 and 128 are in their extended position and link 144 is in its position shown in Figure 3 of the drawings. Slide 66 is in its extreme inboard position on track 60 and stud 86 is at the rear end of slots 76 and 72 so that the hinge block 92 is also in its extreme rearward position to hold the air deflector 26 in its closed position. If it is desired to move the air deflector from its closed position to its fully open position indicated schematically at 26' in Figures 2 and 5, actuator 118 is operated to retract rod 122 and in turn shift rod 128 rearwardly of the body. As rod 128 shifts rearwardly of the body, link 144 will also be shifted rearwardly of the body and will move slide 66 outwardly of the body as flange 68 of the slide moves in groove 64 of track 60. As the slide moves outwardly of the body, slot 72 in the angularly extending portion 70 of the slide will cam stud 86 forwardly of the body within slot 76 of guide 74. This will move the hinge block 92 forwardly of the body so as to move the air deflector to open position by means of link 102 which is pivoted to the air deflector and to the hinge block. The air deflector is movable to any intermediate position between fully open and fully closed position depending on the degree of rearward movement of rod 128. As the hinge block 92 moves forwardly in slot 76, the shank of stud 86 will engage the forward end of the slot in the extreme open position of the air deflector to positively locate the air deflector in this position.

If it is desired to move the air deflector from its fully open position to its fully closed position or to any intermediate position therebetween, actuator 118 is operated to extend rod 122 and in turn shift rod 128 forwardly as it slides within bushing 130. Forward shifting movement of rod 128 will cause link 144 to move slide 66 inboard with respect to the body as flange 68 of the slide moves in groove 64. As slide 66 moves inboard of the body, slot 72 will cam stud 86 rearwardly within slot 76 to move hinge block 92 rearwardly and move the air deflector to closed position by means of link 102.

Since each of the air deflectors is of the same construction although of different hand, the actuator 118 will simultaneously operate both of the air deflectors to move them to a respective open or closed position or any intermediate position therebetween. The actuator exerts a force substantially along the center line of the body and between each of the air deflectors. Since the air deflectors are movable about a hinge axis which is angular to the center line of the body, the operating mechanism for transferring the linear movement of the actuator to linear movement normal to the hinge axis is necessary in order to operate the air deflectors.

Thus, this invention provides an air deflector for a vehicle body which is movable from a closed position plane with the airfoil surface of a body panel to an open position angularly related to the airfoil body panel surface and to the direction of air flow. When the air deflectors are in open position, it can be seen that they form a substantially V-shaped abutment to the air flow to disrupt the air flow over the airfoil surface of body panel 12 and direct the air flow upwardly away from the vehicle windshield 16. If the vehicle 10 is powered by a gas turbine engine, the air deflectors will be very useful upon braking of the engine, since they will act as spoiler flaps to disrupt the air flow over the body and air in stopping the vehicle.

The improved operating mechanism for the air deflectors is particularly useful in installations wherein the hinge axis of the air deflectors is angularly related to the direction of force exerted by the power actuator. Although the operating mechanism has been shown in conjunction with a vehicle having air deflectors mounted on the hood thereof, it is obvious that the operating mechanism can be used in other installations to perform the same function.

While a specific embodiment of this invention has been shown and described, various changes and modifications may be made within the scope and spirit of the invention.

I claim:

1. In combination with a vehicle body having an opening therein, a closure for said opening, means mounting said closure on said body for swinging movement thereof between open and closed positions with respect to said opening, and means for moving said closure between said open and closed positions, said moving means including a pair of guide members having angularly related transverse guide slots, means mounting said members on said body for movement relative to each other to thereby move said slots transversely relative to each other in fixed angular relationship, a slidable member operatively connected to each of said guide slots for movement along one of said slots upon movement of said slots transversely relative to each other, and means operatively connecting said slidable member to said closure for movement of said closure between said open and closed positions thereof upon movement of said slidable member.

2. In combination with a vehicle body having an opening therein, a closure for said opening, means mounting said closure on said body for swinging movement thereof between open and closed positions with respect to said opening, and means for moving said closure between said open and closed positions, said moving means including a pair of guide members having angularly related transverse guide slots, means mounting said members on said body for movement of one of said members relative to the other of said members to thereby move said slot of said one of said members transversely relative to the slot of the other of said members in fixed angular relationship thereto, a slidable member operatively connected to each of said guide slots whereby said slidable member will be moved along said slot of said other of said members upon movement of said slot of said one of said members transversely relative thereto, and means operatively connecting said slidable member to said closure for movement of said closure between said open and closed positions thereof upon movement of said slidable member.

3. In combination with a vehicle body having an opening therein, a closure for said opening, means mounting said closure on said body for swinging movement thereof between open and closed positions with respect to said opening, and means for moving said closure between said open and closed positions, said moving means including a first guide member secured to said body and having a guide slot therein, a second guide member having a guide slot therein located angularly and transversely of said guide slot of said first member, means mounting said second member on said body for movement thereof transverse of said first member whereby said guide slot of said second member will move transverse of said guide slot of said first member in fixed angular relationship thereto, a slidable member operatively connected to each of said guide slots for movement along said guide slot of said first member upon movement of said guide slot of said second member transversely relative thereto, and means pivotally connecting said slidable member to said closure for movement of said closure between said open and closed positions upon movement of said slidable member.

4. In combination with a vehicle body having an opening therein, a closure for said opening, means mounting said closure on said body for swinging movement thereof between open and closed positions with respect to said opening, and means for moving said closure between said open and closed positions, said moving means comprising, a first guide member secured to said body and having a linear guide slot therein, a second guide member having a linear guide slot therein located angular and transverse of said guide slot of said first member, means mounting said second guide member on said body for movement transverse of said first guide member to move said guide slot of said second member transverse to said guide slot of said first member in fixed angular relationship thereto whereby said guide slots have alternate adjacent and remote ends, a slidable member operatively connected to each of said guide slots for movement along said guide slot of said first member between the adjacent and remote ends thereof upon movement of said guide slot of said second member transversely relative to said guide slot of said first member, and means pivotally interconnecting said slidable member and said closure for movement of said closure between open and closed positions upon movement of said slidable member.

5. In combination with a vehicle body having an opening therein, a closure for said opening, means on said body defining a hinge axis and supporting said closure for movement between open and closed positions about said hinge axis, and means for moving said closure between said open and closed positions, said moving means including a first guide member secured to said body and having a linear guide slot therein located substantially normal to said hinge axis whereby said slot has adjacent and remote ends with respect thereto, a second guide member having a guide slot therein located angular and transverse of said guide slot of said first member, means mounting said second guide member on said body for movement transverse of said first guide member whereby said guide slot of said second member moves transverse of said guide slot of said first member in fixed angular relationship thereto, a slidable member operatively connected to each of said guide slots for movement along said guide slot of said first member from the adjacent to the remote end thereof upon movement of said guide members transversely relative to each other, and means pivotally connecting said slidable member and said closure for movement of said closure between said open and closed positions upon movement of said slidable member between the adjacent and remote ends of said guide slot of said first member.

6. In combination with a vehicle body having an opening therein, a closure for said opening, means on said body defining a hinge axis and supporting said closure for movement between open and closed positions about said hinge axis, and means for moving said closure between said open and closed positions, said moving means including a first guide member secured to said body and having a linear guide slot therein located substantially normal to said hinge axis whereby said slot has adjacent and remote ends with respect thereto, a second guide member having a guide slot therein located angular and transverse of said guide slot of said first member, means mounting said second guide member on said body for movement transverse of said first guide member whereby said guide slot of said second member moves transverse of said guide slot of said first member in fixed angular relationship thereto, a slidable member operatively connected to each of said guide slots for movement along said guide slot of said first member from the adjacent to the remote end thereof upon movement of said guide members transversely relative to each other, means pivotally interconnecting said slidable member and said closure for movement of said closure between said open and closed positions upon movement of said slidable member between the adjacent and remote ends of said guide slot of said first member, a power actuator mounted on said body, and shiftable means interconnecting said power actuator and said second guide member for movement thereof relative to said first guide member.

7. In combination with a vehicle body having an opening therein, a closure for said opening, means on said body defining a hinge axis and supporting said closure for movement between open and closed positions about said hinge axis, and means for moving said closure between said open and closed positions, said moving means including a first guide member secured to said body and having a linear guide slot therein located substantially normal to said hinge axis whereby said slot has adjacent and remote ends with respect thereto, a second guide member having a guide slot therein located angular and transverse of said guide slot of said first member whereby said guide slots have adjacent and remote ends with respect to each other, means mounting said second guide member on said body for movement transverse of said first guide member whereby said guide slot of said second member moves transverse of said guide slot of said first member in fixed angular relationship thereto to alternate the adjacent and remote ends of said guide slots, a slidable member operatively connected to each of said guide slots for movement along said guide slot of said first member from the adjacent to the remote end thereof upon movement of said guide members transversely relative to each other, and means pivotally interconnecting said slidable member and said closure for movement of said closure between said open and closed positions upon movement of said slidable member between the adjacent and remote ends of said guide slot of said first member.

8. In combination with a vehicle body having an opening therein, a closure for said opening, means on said body defining a hinge axis and supporting said closure for movement between open and closed positions about said hinge axis, and means for moving said closure between said open and closed positions, said moving means including a first guide member secured to said body and having a linear guide slot therein located substantially normal to said hinge axis whereby said slot has adjacent and remote ends with respect thereto, a second guide member having a guide slot therein located angular and transverse of said guide slot of said first member, whereby said guide slots have adjacent and remote ends with respect to each other, means mounting said second guide member on said body for movement transverse of said first guide member whereby said guide slot of said second member moves transverse of said guide slot of said first member in fixed angular relationship thereto to alternate the adjacent and remote ends of said guide slots, a slidable member operatively connected to each of said guide slots for movement along said guide slot of said first member from the adjacent to the remote end thereof upon movement of said guide members transversely relative to each other, means pivotally interconnecting said slidable member and said closure for movement of said closure between said open and closed positions upon movement of said slidable member between the adjacent and remote ends of said guide slot of said first member, power actuating means mounted on said body and movable transversely of said second guide member, and shiftable link means interconnecting said power actuator and said second guide member for movement of said second guide member relative to said first guide member.

References Cited in the file of this patent

UNITED STATES PATENTS

| | | |
|---|---|---|
| 1,480,095 | Moller | Jan. 8, 1924 |
| 1,857,705 | Wolff et al. | May 10, 1932 |
| 2,119,399 | Muschong | May 31, 1938 |

FOREIGN PATENTS

| | | |
|---|---|---|
| 383,648 | Germany | Oct. 15, 1923 |
| 440,954 | Great Britain | Jan. 9, 1936 |